(12) United States Patent
Dull et al.

(10) Patent No.: US 9,039,858 B2
(45) Date of Patent: *May 26, 2015

(54) COMPOSITE STRIP

(75) Inventors: Kenneth M. Dull, Puyallup, WA (US);
William H. Ingram, Puyallup, WA (US)

(73) Assignee: THE BOEING COMPANY, Chicago, IL (US)

( * ) Notice: Subject to any disclaimer, the term of this patent is extended or adjusted under 35 U.S.C. 154(b) by 50 days.

This patent is subject to a terminal disclaimer.

(21) Appl. No.: 13/074,430

(22) Filed: Mar. 29, 2011

(65) Prior Publication Data

US 2011/0195232 A1 Aug. 11, 2011

Related U.S. Application Data

(62) Division of application No. 11/832,956, filed on Aug. 2, 2007, now Pat. No. 8,016,970.

(51) Int. Cl.
| | |
|---|---|
| *B29C 65/00* | (2006.01) |
| *B29C 70/54* | (2006.01) |
| *B29C 70/34* | (2006.01) |
| *B29C 70/44* | (2006.01) |
| *B32B 17/04* | (2006.01) |

(Continued)

(52) U.S. Cl.
CPC ........... *B29C 70/54* (2013.01); *Y10T 156/1093* (2015.01); *Y10T 156/10* (2015.01); *Y10T 428/2476* (2015.01); *Y10T 428/24752* (2015.01); *B32B 2305/076* (2013.01); *B32B 2309/10* (2013.01); *B32B 17/04* (2013.01); *B32B 19/04* (2013.01); *B32B 37/00* (2013.01); *B32B 37/02* (2013.01); *B32B 2037/1253* (2013.01); *B29C 39/00* (2013.01); *B29C 37/02* (2013.01); *B29C 70/342* (2013.01); *B29C 70/446* (2013.01)

(58) Field of Classification Search
CPC ........ B32B 35/00; B32B 17/04; B32B 31/00; B32B 7/14; B32B 19/04; B32B 37/00; B32B 37/02; B32B 2037/1253; B32B 2305/076; B32B 2309/10; Y10T 156/1093; Y10T 156/10; Y10T 428/24752; Y10T 428/2476; B29C 70/342; B29C 70/54; B29C 37/02; B29C 65/00; B29C 53/58; B29C 53/80; B29C 45/14; B29C 39/00; B29C 22/00; B27N 3/10; B28B 7/30
USPC .................................... 156/60, 249
See application file for complete search history.

(56) References Cited

U.S. PATENT DOCUMENTS

| | | | |
|---|---|---|---|
| 4,084,029 A * | 4/1978 | Johnson et al. | 428/119 |
| 4,401,495 A | 8/1983 | McKinney | |

(Continued)

OTHER PUBLICATIONS

Prospector:Composites, Composite IM7/5250-4 Unidirectional Prepreg, Published Oct. 28, 2014.*

(Continued)

*Primary Examiner* — Alex Efta
(74) *Attorney, Agent, or Firm* — Yee & Associates, P.C.

(57) ABSTRACT

A composite strip and a method of manufacturing a pre-cured composite strip. A pre-cured composite strip having a thermoset resin may be placed on a surface of a portion of a composite component where a caul plate seam may be expected. Caul plates may be placed on the composite component after placing the pre-cured composite strip to form the caul plate seam. The composite component may be cured after placing the caul plates on the composite component.

18 Claims, 5 Drawing Sheets

(51) Int. Cl.
  *B32B 19/04* (2006.01)
  *B32B 37/00* (2006.01)
  *B32B 37/02* (2006.01)
  *B32B 37/12* (2006.01)
  *B29C 39/00* (2006.01)
  *B29C 37/02* (2006.01)

(56) References Cited

U.S. PATENT DOCUMENTS

| | | | | |
|---|---|---|---|---|
| 4,589,562 | A | * | 5/1986 | Fawley ................ 220/590 |
| 4,734,146 | A | * | 3/1988 | Halcomb et al. ............ 156/148 |
| 5,242,523 | A | | 9/1993 | Willden et al. |
| 5,972,141 | A | * | 10/1999 | Ellyin ................ 156/94 |
| 6,508,909 | B1 | | 1/2003 | Cerezo Pancorbo et al. |
| 6,511,570 | B2 | | 1/2003 | Matsui |
| 6,513,757 | B1 | * | 2/2003 | Amaoka et al. ............ 244/123.7 |
| 6,515,081 | B2 | | 2/2003 | Oosedo et al. |
| 6,692,681 | B1 | * | 2/2004 | Lunde ................ 264/510 |
| 6,821,368 | B2 | | 11/2004 | Benson et al. |
| 7,080,805 | B2 | | 7/2006 | Prichard et al. |
| 7,204,951 | B2 | | 4/2007 | Simpson et al. |
| 8,016,970 | B2 | * | 9/2011 | Dull et al. ................ 156/249 |
| 2002/0007022 | A1 | | 1/2002 | Oosedo et al. |
| 2002/0031641 | A1 | * | 3/2002 | George et al. ............ 428/105 |
| 2003/0066589 | A1 | | 4/2003 | Benson et al. |
| 2005/0056362 | A1 | * | 3/2005 | Benson et al. ............ 156/163 |
| 2005/0247818 | A1 | | 11/2005 | Prichard et al. |
| 2006/0172636 | A1 | * | 8/2006 | Bech ................ 442/1 |
| 2006/0188696 | A1 | * | 8/2006 | Grose et al. ................ 428/156 |
| 2010/0006702 | A1 | * | 1/2010 | Fogarty et al. ............ 244/131 |
| 2010/0024964 | A1 | | 2/2010 | Ingram, Jr. |

OTHER PUBLICATIONS

"737-900 Panel Join Begins", Boeing, Mar. 8, 2000, pp. 1-2 http:www.boeing.com/commercial/737family/news/2000/photorelease/photo_release_000308a.html.

Kingsley-Jones, "Airbus set to roll out carbonfibre A350 fuselage demonstrator", Flight International, May 22, 2008, pp. 1-2 http://www.flightglobal.com/articles/2008/05/22/224026/airbus-set-to-roll-out-carbonfibre-a350-fuselage-demonstrator.html.

Wallace, "Boeing unveils nose section of new 787", Seattle Post-Intelligencer, Aug. 26, 2005, pp. 1-3 http://seattlepi.nwsource.com/business/322904_dreamliner09.html.

Campbell, "Manufacturing Technology for Aerospace Structural Materials", Elsevier, 2006, pp. 1-617 http://www.scribd.com/doc/6395263/Manufacturing-for-Aerospace-Structural-Materials.

Pettit et al., "Validated Feasibility Study of Integrally Stiffened Metallic Fuselage Panels for Reducing Manufacturing Costs", The Boeing Company, Long Beach CA, May 2000, NASA/CR-2000-209342, pp. 1-132 http://ntrs.nasa.gov/archive/nasa/casi.ntrs.nasa.gov/20000057324_2000078253.pdf.

USPTO Office Action for U.S. Appl. No. 11/832,956 dated Jun. 11, 2010.

USPTO Final Office Action for U.S. Appl. No. 11/832,956 dated Nov. 15, 2010.

USPTO Notice of Allowance for U.S. Appl. No. 11/832,956 dated Mar. 2, 2011.

* cited by examiner

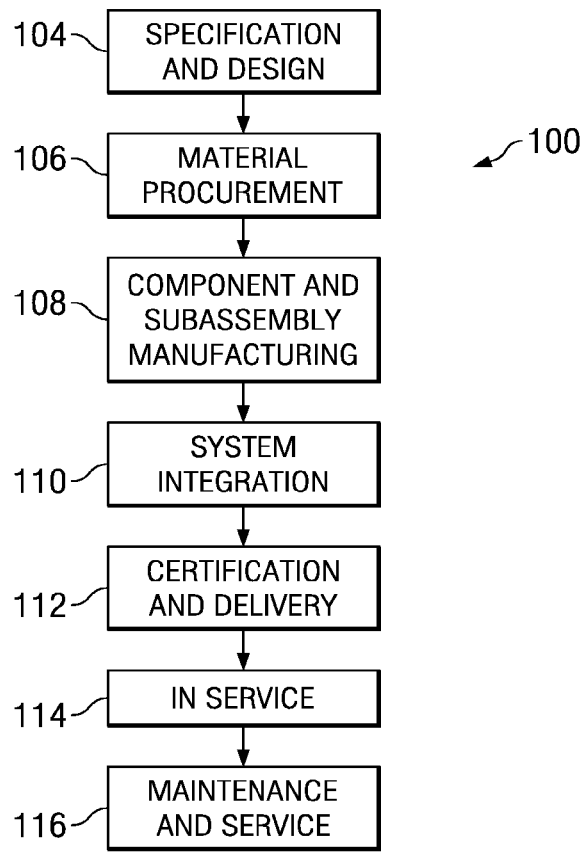
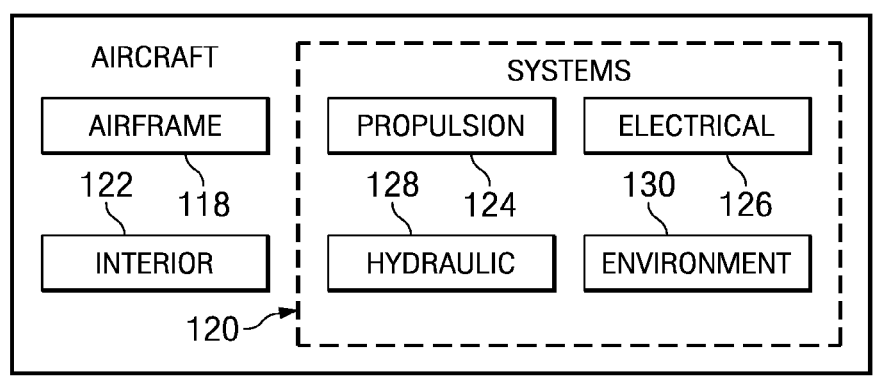

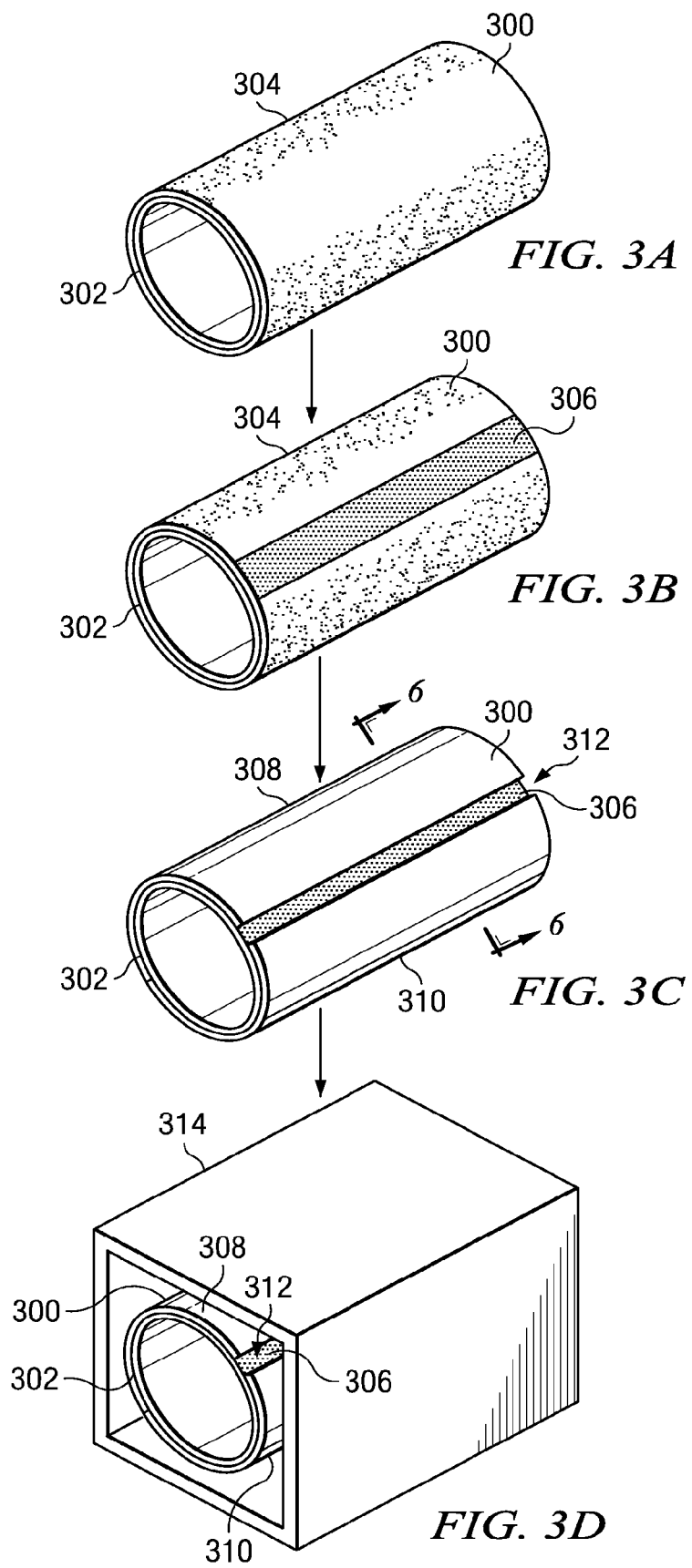

COMPOSITE STRIP

This application is a divisional of application Ser. No. 11/832,956, filed Aug. 2, 2007. Application Ser. No. 11/832,956 is now issued as U.S. Pat. No. 8,016,970.

BACKGROUND INFORMATION

1. Field

The present disclosure relates generally to composite components and in particular to a method and apparatus for manufacturing composite components. Still more particularly, the present disclosure relates to a method and apparatus for improving the appearance of a composite component.

2. Background

The aircraft are being designed and manufactured with greater and greater percentages of composite materials. Some aircraft may have more than fifty percent of its primary structure made from composite materials. Composite materials may be used in aircraft to decrease the weight of the aircraft. This decreased weight may improve payload capacities and fuel efficiencies. Further, composite materials may provide longer service life for various components in an aircraft.

Composite materials may be tough, light-weight materials, created by combining two or more dissimilar components. For example, a composite may include fibers and resins. The fibers and resins may be combined to form a cured composite material.

Further, by using composite materials, portions of an aircraft may be created in larger pieces or sections. For example, a fuselage in an aircraft may be created in cylindrical sections that may be put together to form the fuselage of the aircraft. Other examples may include without limitation wing sections joined to form a wing or stabilizer sections joined to form a stabilizer.

In creating composite components or structures with a curved or circular shape, the composite material may be shaped and/or laid up using a mold that may be placed against an inner mold line (IML) of a composite component. As a result, different features, textures, or appearances may be created on the inner surface of the composite component and/or composite lay up using an inner mold that contacts the inner mold line of the composite component. With a composite component in the form of a fuselage for an aircraft, these features, textures, or appearances may be used on the inside of a passenger cabin. These features, textures or appearances include, for example without limitation, windows, visible lines framing a window for aesthetics, and textures on cabin walls.

In forming a composite component from composite material, the outer surface or outer mold line (OML) of the composite material may not be subject to an outer mold when an inner mold is used. In the case of a section of a fuselage, this outer mold line may provide the outside appearance of the surface of the fuselage and/or barrel section. With this type of composite component, a smooth surface may be desired.

Depending on the size of the component, multiple caul plates may be required to be placed on the outer surface of the composite component during curing or forming of the composite component. A caul plate may be a thin gauge sheet that may be made, without limitation, of a metal or a composite material. These caul plates may be used to control the outer mold line and create a smooth surface. Large composite components may require multiple caul plates. When multiple caul plates are used, these plates may be placed next to each other. A gap may be left between adjacent caul plates to accommodate caul plate thermal expansion of the curing and/or heating processes during composite component fabrication.

At these edges of the caul plates, inconsistencies, such as a visible mark off, fiber waviness and/or fiber distortion may occur. This mark off and fiber distortion may result in a visible line or seam. This type of inconsistency may also occur if a vacuum bag contacts the composite material exposed in the gap between the caul plates and/or if the caul plates overlap during the curing process. Further, fiber waviness may occur with an unacceptable mark off or other type of inconsistency being visible on the cured composite and located in the gap between where the caul plates were during cure. These types of inconsistencies may be undesirable.

Fillers and surfacing methods may be used to reduce the visibility of these inconsistencies. In other words, the fillers may separate from the composite component prior to the scheduled repainting of the surface of the aircraft. Further, the surface of the composite component may only be lightly sanded in preparation for painting. Excessive sanding may result in an undesirable appearance of the finished aircraft.

Currently, these types of inconsistencies in the aircraft may be controlled by placing or locating caul plates such that the gaps in which inconsistencies may occur in locations on the aircraft that are not clearly visible in the finished product. These gaps may also be referred to as caul plate seams. For example, inconsistencies from caul plate seams located along a section of the fuselage where a wing is attached to the fuselage or the bottom of the fuselage may not be easily visible. Further, placing caul plates such that caul plate seams are along cut out areas for windows may also minimize inconsistencies.

Accordingly, there is a need for a method and apparatus for minimizing inconsistencies appearing on the surface of a composite component, which over comes the problems discussed above. Embodiments of the disclosure are intended to satisfy this need.

SUMMARY

An advantageous embodiment of the present disclosure provides a method and apparatus for applying a pre-cured composite strip to a composite component. A pre-cured composite strip having a thermoset resin may be placed on a surface of a portion of the composite component where a caul plate seam may be expected. Caul plates may be placed on the composite component after placing the pre-cured composite strip to form the caul plate seam. The composite component may be cured after placing the caul plates on the composite component.

In another advantageous embodiment, a pre-cured composite strip may be manufactured by forming a composite strip may be formed. The composite strip then may be cured to form the pre-cured composite strip.

Another advantageous embodiment may comprise a pre-cured composite strip, a composite tape layer, and a second composite fabric layer. The first composite fabric layer may have a first width. The composite tape layer may be located on the composite fabric layer and may have a second width that may be smaller that the first width. The second composite fabric layer may be located on the composite tape layer and may have a third width that may be smaller that the second width.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments themselves, however, as well as a preferred mode of use, further objectives and advantages thereof, will best be understood by reference to the following detailed description of an advantageous embodiment of the present disclosure when read in conjunction with the accompanying drawings, wherein:

FIG. 1 is a flow diagram of aircraft production and service methodology in accordance with an advantageous embodiment;

FIG. 2 is a block diagram of an aircraft in accordance with an advantageous embodiment;

FIGS. 3A-3D are an illustration of a method and apparatus for controlling mark off in fiber migration in a composite structure in accordance with an advantageous embodiment;

DETAILED DESCRIPTION

Figure 4:
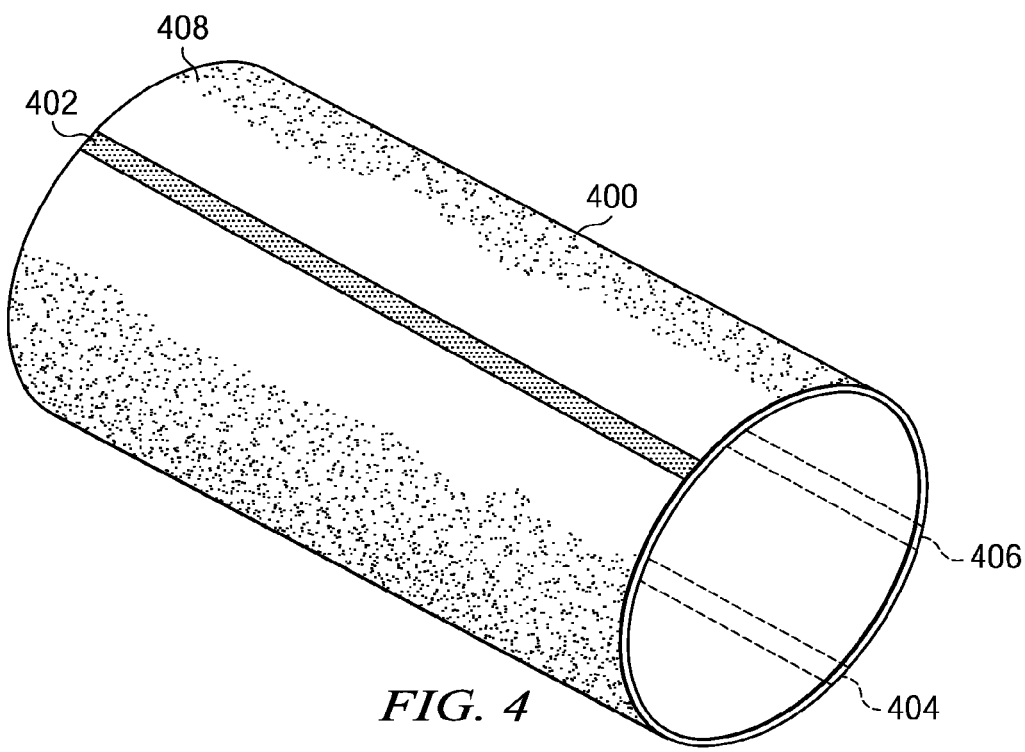
FIG. 4 is an isometric view of a composite component in accordance with an advantageous embodiment.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

The different advantageous embodiments may provide a method and apparatus for minimizing lines or other types of inconsistencies on the surface of a composite component. In particular, these different advantageous embodiments may control, reduce, or minimize inconsistencies, such as mark off and fiber migration to increase the aesthetic appearance of composite components.

In the different illustrative examples, inconsistencies caused by a caul plate seam between caul plates may be reduced by using a pre-cured composite. In these examples, the composite may be bonded and/or applied to a substrate, which may be the composite component. The pre-cured composite may be a pre-cured composite strip placed on the outer mold line of the composite component prior to the application and/or placement of the caul plates. The pre-cured composite strip may be placed where, for example, a caul plate seam may occur between adjacent caul plates.

In these examples, when cured, the pre-cured composite strip may be sufficiently stiff to prevent the adjacent caul plates from forming an inconsistency in the composite component if these caul plates move or slide over the composite strip during the curing process. As a result, by allowing caul plate movement over the pre-cured composite strip, fiber and resin movement or other changes that may cause inconsistencies may be prevented. As a result, inconsistencies caused by caul plate movement during curing may be eliminated or reduced in extent to produce a surface appearance that meets aesthetic requirements.

Further, the different illustrative examples may reduce out-of-plane fiber waviness and increase the appearance quality of the surface of the component. Out-of-plane fiber waviness may be an out-of-plane location of fibers in an uncured ply stack up or cured part in which one or more of the plies may be permanently cured into a ridge, depression, or fold not consistent with part geometry. The out-of-plane direction may be either away from or into the part.

Also, the different embodiments may reduce the need for filling the surface of the component. Also, by using a pre-cured composite strip, a larger gap tolerance may be used in placing caul plates adjacent to each other.

Turning now to FIGS. 3A-3D, an illustration of a method and apparatus for controlling mark off in fiber migration in a composite structure is depicted in accordance with an advantageous embodiment. In this example, composite component 300 may be a fuselage for an aircraft, such as fuselage 106 in aircraft 100 in FIG. 1. The construction or assembly of composite component 300 may be performed during component and subassembly manufacturing 108 during aircraft manufacturing and service method 100 in FIG. 1.

In this example, the materials for composite component 300 are placed around mold 302, or mold 302 may be placed into the inner mold line portion of composite component 300. These materials may be, for example without limitation, composite tape and/or composite fabric. Layers of these types and other types of composite materials may be laid down on to mold 302 to form composite component 300. In this example, mold 302 is an inner mold that may contain features for an inner mold line of composite component 300. Surface 304 is the surface for the outer mold line of composite component 300.

Next, composite strip 306 may be placed onto surface 304 of composite component 300. In these examples, composite strip 306 may be a pre-cured composite strip. Further, composite strip 306 may be attached to surface 304 of composite component 300 through an adhesive. For example, an adhesive film may be placed onto a surface of composite strip 306. Curing composite component 300 with composite strip 306 may cause the adhesive film and composite strip 306 to be integrated and/or attached to composite component 300.

After the application of composite strip 306 to composite component 300, caul plates 308 and 310 may be placed onto composite component 300. These caul plates may be used to provide a smooth surface and to avoid inconsistencies from occurring that are not desired on surface 304 of composite component 300.

Also, caul plate seam 312 may be present between caul plates 308 and 310. Caul plate seam 312 may be a gap that is present between caul plates 308 and 310. The size of caul plate seam 312 may be selected to take into account different coefficients of expansion and compaction when composite component 300 is heated along with caul plates 308 and 310. Composite strip 306 may result in a reduction and/or elimination of inconsistencies in the area of caul plate seam 312 that may reduce the visual aesthetics of composite component 300.

More specifically, depending on the material used to form caul plates 308 and 310, these caul plates may expand at a different rate from composite component 300. Further, composite component 300 may reduce in diameter during the curing process. As a result, caul plate seam 312, allows caul plate 308 and caul plate 310 to expand and/slide to avoid buckling or hitting each other. Composite strip 306 may aid in reducing inconsistencies due to the expansion and/or sliding of caul plate 308 and caul plate 310.

In this example, caul plates 308 and 310 may be placed such that caul plate seam 312 may run longitudinally along composite component 300. Depending on the particular implementation, a caul plate seam may extend around the circumference of composite component 300, rather than longitudinally, as depicted with caul plate seam 312.

Next, composite component 300 may be prepared for curing and placed into oven 314 with caul plates 308 and 310 in place. This assembly may be cured by heating oven 314 to an appropriate temperature needed to cure the composite materials within composite component 300.

In these examples, oven 314 may be a composite curing oven in which heat and pressure may be applied to composite component 300 as the curing process occurs within oven 314. Oven 314 may provide temperatures of around three hundred fifty degrees to cure composite component 300. In these examples, oven 314 may be an autoclave that applies pressure and heat. Of course, any type of oven capable of curing composite parts may be used in these different embodiments. In addition to using oven 314, other types of curing processes may be employed. For example, an electron beam system may be used to cure composite components instead of using a thermal curing system, such as oven 314.

With reference now to FIG. 4, an isometric view of a composite component is depicted in accordance with an advantageous embodiment. In this example, composite component 400 is an example of composite component 300 in FIG. 3. In particular, composite component 400 may be an example of a fuselage section of an aircraft that has been cured in an oven, such as oven 314 in FIG. 3. In this example, pre-cured composite strips 402, 404, and 406 may be present on surface 408 of composite component 400. Pre-cured composite strips 402, 404, and 406 may be located in sections or areas in which caul plate seams were present.

Figure 5:
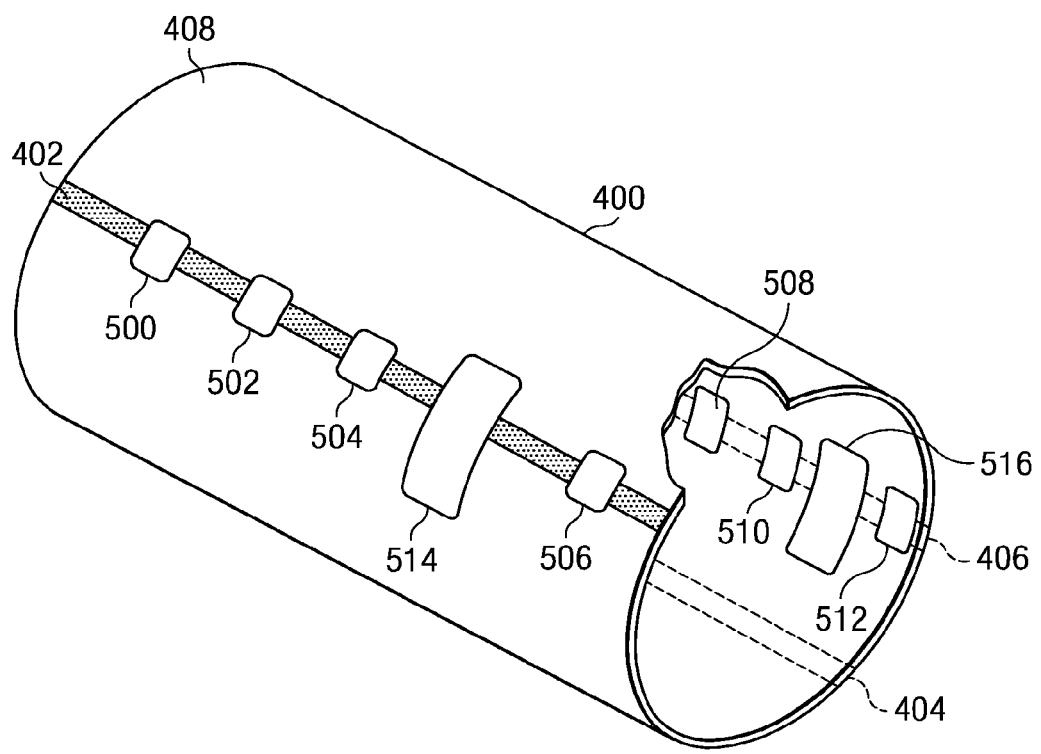
FIG. 5 is an isometric view of a composite component after trim routing in accordance with an advantageous embodiment.

Turning now to FIG. 5, an isometric view of a composite component after trim routing is depicted in accordance with an advantageous embodiment. In this example, trim and routing processes may have been performed on composite component 400. This process may generate windows, such as windows 500, 502, 504, 506, 508, 510 and 512. Additionally, passenger door trims 514 and 516 also may now be present after trim and routing processes have been performed on composite component 400. Although, in these examples, pre-cured composite strips 402 and 406 may be aligned on the windows, such an alignment may not be necessary.

Figure 6:
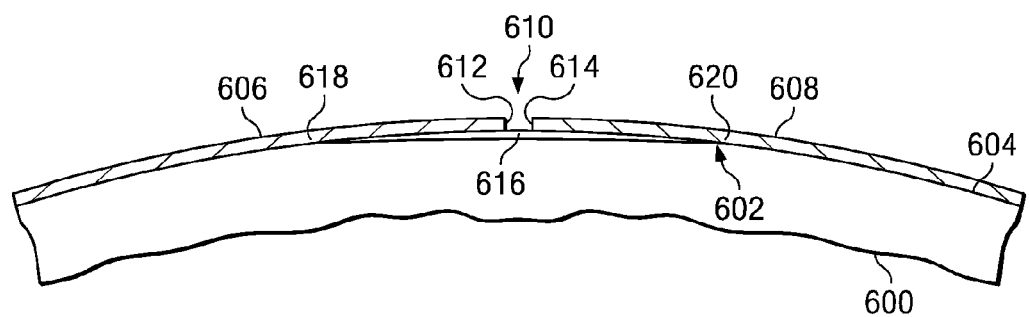
FIG. 6 is a cross-section view of a composite component with a composite strip and caul plates in place in accordance with an advantageous embodiment.

Turning now to FIG. 6, a cross-section view of a composite component with a composite strip and caul plates in place is depicted in accordance with an advantageous embodiment. In this example, composite component 600 may be an example of a cross-section view for composite component 300 in FIG. 3, taken along lines 6-6. In this example, composite strip 602 may be placed on surface 604 of composite component 600. Composite strip 602 may be an example of composite strip 306 in FIG. 3. In this example, surface 604 is an outer surface for an outer mold line of composite component 600. In this example, caul plates 606 and 608 may be placed onto composite component 600 and composite strip 602. Caul plates 606 and 608 may be an example of caul plates 308 and 310 in FIG. 3.

In this example, caul plate seam 610 may be present between edge 612 of caul plate 606 and edge 614 of caul plate 608. In this example, caul plate seam 610 may have a ten millimeter gap. The size of the gap for caul plate seam 610 may vary depending on factors, such as, for example, thermal expansion and/or the size of caul plates 606 and 608.

Further, in this particular illustrative example, composite strip 602 may taper from center portion 616 to edges 618 and 620 of composite strip 602. The amount of tapering that occurs may vary depending on the implementation. The tapering in composite strip 602 may allow this strip to transition from enough plies to resist formation of inconsistencies during cure to a single ply. In these examples, each ply may be stepped down in width such that the underlying plies may absorb the change in step without negative effect on the appearance of the composite component. This may be driven by the thickness of the underlying laminate.

The width of the composite strip may be based on different factors, such as, for example, the gap between the caul sheets, the method used to align the pre-cured strip, or weight limitations. In these examples, one factor in setting width of the pre-cured strip may be to use a fewest number of plies and a maximum thickness area that may completely support the edges of the caul sheet. Additionally, the thermal expansion and compaction factors may be taken into account.

Figure 7:
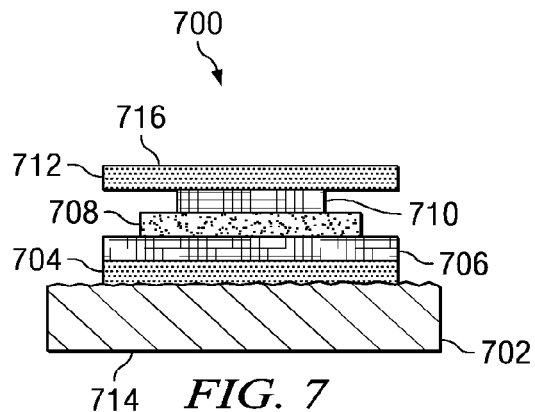
FIG. 7 is an illustration of a cross-section view of layers in a composite strip in accordance with an advantageous embodiment.

Turning now to FIG. 7, an illustration of a cross-section view of layers in a composite strip is depicted in accordance with an advantageous embodiment. In this example, composite strip 700 may be formed on base plate 702. Base plate 702 may be a structure on which composite strip 700 may be created. Further, composite strip 700 may be cured to form a pre-cured composite strip on base plate 702 as described above. In this particular illustrative example, composite strip 700 may include peel ply layer 704, composite fabric layer 706, composite tape layer 708, composite fabric layer 710, and peel ply layer 712.

Composite fabric layer 706 and composite fabric layer 710 both may be made of the same type of materials or may be made from different materials depending on the particular implementation. These fabrics may include fibers and resins. The fibers may be, for example, carbon fibers. In these examples, the resins may be thermoset resins. A thermoset resin may be a resin that does not reflow or soften once it has been cured. These composite fabric layers may be implemented using any type of composite fabric in these examples.

Composite tape layer 708 also may be implemented using any type of composite tape. In these particular examples, resin in composite tape layer 708 also is a thermoset resin. In these examples, tape may consist of a series of unidirectional fibers that may become stiff in an outer mold line direction that may be 90 degrees or perpendicular to the caul plate seam. This stiffness may be utilized to resist the caul sheets forming inconsistencies in the pre-cured strips during the cure. Fibers that run parallel to the caul plate seam may not resist the caul sheets forming inconsistencies although some fibers may be in the direction of the seam to allow for handling of the pre-cured strip. In these examples, the fabric was chosen to match the rest of the surface of the composite component. Other applications may use tape as the outer ply.

In these examples, peel ply layer 704 and peel ply layer 712 may be used to provide a surface prepared for a mechanical bond. In particular, these layers may provide a rough surface when removed from composite strip 700. Peel ply layer 704 and peel ply layer 712 may be optional layers. Alternatively, surfaces on composite strip 700 may be prepared for mechanical bonding through other mechanisms, such as sanding or other surface preparation processes to obtain a clean rough surface. After curing composite strip 700, peel ply layer 704 may be removed. After removal of peel ply layer 704, an adhesive layer may be placed onto surface 714 of composite fabric layer 706. Peel ply layer 712 may be removed after curing composite strip 700, and a surfacer layer may be placed onto surface 716 of composite strip 700. The surfacer layer may provide a layer that will be sanded during the finishing of the composite component to feather or smooth composite strip 700 into the outer mold line of the composite component. In these examples, composite strip 700 does not require being debalked using a vacuum bagging process prior to pre-cure.

In this example, composite strip 700 may be tapered with composite fabric layer 706 having a wider width than composite tape layer 708. Composite fabric layer 710 may have an even smaller width as compared to composite tape layer 708 and composite fabric layer 706.

In these particular examples, peel ply layer 704 and peel ply layer 712 may have a width of around 3.0 inches. Composite fabric layer 706 may have a width of around 3.0 inches, and composite tape layer 708 may have a width of around 2.25 inches. Composite fabric layer 710 may have a width of around 1.5 inches in these examples.

Figure 8:
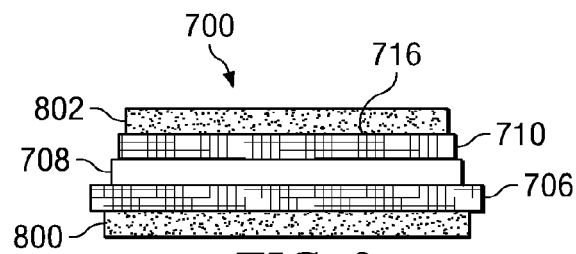
FIG. 8 is a cross-section view of a completed composite strip in accordance with an advantageous embodiment.

Turning now to FIG. 8, a cross-section view of a completed composite strip is depicted in accordance with an advantageous embodiment. In this example, composite strip 700 from FIG. 7 now may include adhesive film layer 802 and surfacer layer 800. In this form, composite strip 700 may be ready for application to an area or section where a caul plate seam may be expected or planned based on placement of caul plates.

Although composite strip 700 is illustrated with three layers of composite materials, other numbers of layers of composite materials may be used depending on the particular implementation. For example, composite strip 700 may have two layers comprising a composite fabric layer and a composite tape layer. Alternatively, composite strip 700 may have more layers, such as four or five layers. The number of layers used may depend on the thickness desired with respect to the thickness desired for the composite strip. Typically, a thinner thickness may be desired to reduce weight on the composite component. Also, the width of composite strip 700 also may be selected based on the composite strip 700 weight and gap size requirement.

In these examples, the composite materials used in composite strip 700 may vary. In these examples, the composite materials used in composite strip 700 may be ones that may not reflow or soften when reheated after curing. In particular, the composite materials may be made with thermoset materials or resins, which will not melt or soften after the initial curing. In this manner, some stiffness may be present when bonding the composite strip to the rest of the composite component. This stiffness may allow the caul plates to slide on the composite strip without causing inconsistencies in the appearance of the surface of the composite component. In this example, composite strip 700 may be pre-cured flat on surface 714 in FIG. 7. In other embodiments, composite strip 700 may be pre-cured on a curved surface having a radius around the same as the outer mold line for the fuselage section.

In particular, the different advantageous embodiments may be implemented to reduce or eliminate an appearance of inconsistencies resulting from movement and/or expansion of adjacent caul sheets during the curing of a composite structure or component in an aircraft.

Figure 9:
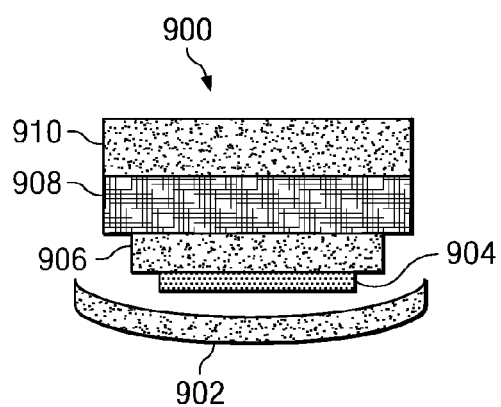
FIG. 9 is a cross-section view of a composite strip in accordance with an advantageous embodiment.

Turning now to FIG. 9, a cross-section view of a composite strip is depicted in accordance with an advantageous embodiment. In this example, composite strip 900 may be pre-cured prior to application or use on a composite component.

In this example, composite strip 900 may include peel ply layer 902, tape layer 904, tape layer 906, fabric layer 908, and surfacer layer 910. In this particular illustrative example, tape layer 904 may have the smallest width. Tape layer 906 may have the second smallest width, and fabric layer 908 may have the largest width.

In this particular example, peel ply layer 902 may have a width of around 3.5 inches. Tape layer 904 may have a width of around 1.0 inch, and tape layer 906 may have a width of around 2.0 inches. Fabric layer 908 may have a width of around 3.0 inches in this example. Surfacer layer 910 may have a width of around 3.0 inches. Peel ply layer 902 may be removed prior to application to a surface of a composite component with an adhesive layer being added.

Figure 10:
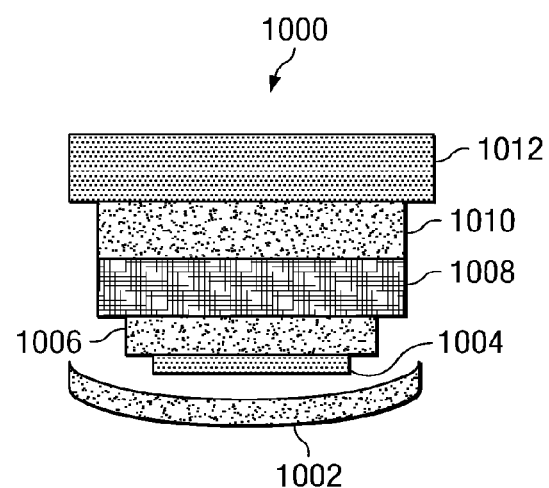
FIG. 10 is an illustration of a cross-section view of another example of a composite strip in accordance with an advantageous embodiment.

With reference now to FIG. 10, an illustration of a cross-section view of another example of a composite strip is depicted in accordance with an advantageous embodiment. In this example, composite strip 1000 includes peel ply layer 1002, tape layer 1004, tape layer 1006, fabric layer 1008, surfacer layer 1010, and peel ply layer 1012. In this particular example, peel ply layer 1012 may have a width of around 3.5 inches. Surfacer layer 1010 may have a width of around 3.0 inches. Fabric layer 1008 may have a width of around 3.0 inches. Tape layer 1006 may have a width of around 2.0 inches, and tape layer 1004 may have a width of around 1.0 inch. Peel ply layer 1002 may have a width of around 3.5 inches in this example.

The different types of layers and widths illustrated in FIGS. 7-10 are provided for purposes of illustrating some different configurations that may be implemented. These examples are not meant to limit the manner in which layers may be selected or the widths. The different examples illustrate one embodiment of layers of different widths to provide a tapered composite strip for use in areas in which caul plate seams may be expected.

In these illustrative examples, the length of these composite strips may be around 60 inches. Further, the zero degree ply direction may be parallel to the length of the composite strips in these examples. In these examples, one optimal utilization of the tape materials may be when they are used with the fiber direction in the outer mold line plane that is 90 degrees or perpendicular to the length of a caul plate seam.

Some examples of materials that may be used in fabric and tape layers include, for example, without limitation, carbon, fiberglass, boron, ceramic, and aramids. The resins that may be found in these types of layers may include, for example, alkyd polyester, epoxy, urea-formaldehyde, liquid-crystal, polytetrafluoroethylene, polyetheretherketone, and polyethersulfone. Adhesive film layers used in the depicted examples may take the form of epoxy. With some resin/prepreg systems, an adhesive film is not required because the resin in the prepreg may be considered to be self-adhesive. Peel ply layers may be formed using nylon or polyester in the different examples.

In these examples, the fabric and tape may be prepreg components. In other examples, the composite strips may be fabricated with resin infusion of dry fabric and/or tackified fabric.

Figure 11:
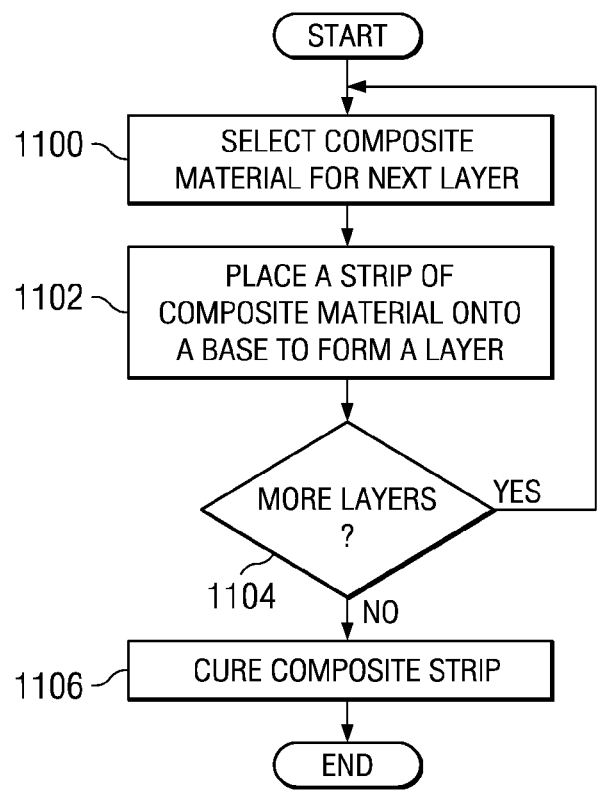
FIG. 11 is a flowchart of a process for creating a composite strip in accordance with an advantageous embodiment.

Turning now to FIG. 11, a flowchart of a process for creating a composite strip is depicted in accordance with an advantageous embodiment. The process illustrated in FIG. 11 may be used to create a composite strip, such as composite strip 604 in FIG. 6 or composite strip 700 in FIG. 7 or FIG. 8.

The process begins by selecting a composite material for a layer in the composite strip (operation 1100). Operation 1100 may include a selection of the type of material and the dimensions for the material. A selection of a fabric, tape, peel ply, or other material may be made. The dimensions selected may include length, width, and thickness.

In this example, the first layer may take the form of a composite fabric. Of course, other types of composite materials may be used, depending on the implementation. In this example, the base may be a base, such as base plate 702 in FIG. 7. Depending on the implementation, the strip may be placed onto a strip or layer of peel ply that is already present on the base. The selected strip of the composite material is placed onto a base to form a layer (operation 1102). The strip may be placed on top of another layer on the bases for layers subsequent to the initial layer.

Next, the process determines whether additional layers may be needed for the composite strip (operation 1104). If additional layers are needed, the process returns to operation 1100 to select another material for the next layer of the composite strip. In selecting another layer, a selection of a fabric, tape, peel ply, surfacer, or other material may be made. This selection may also include dimensions for this next layer. The width of this next layer may be narrower than a previous layer to taper the composite strip.

With reference again to operation 1104, if additional layers are not needed, the process then cures the composite strip (operation 1106). Thereafter, the process terminates.

Figure 12:
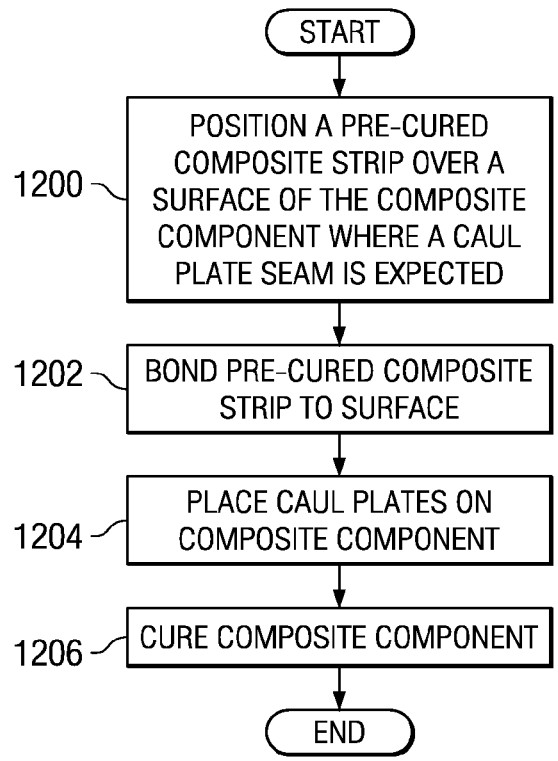
FIG. 12 is an illustration of a process for manufacturing a composite component in accordance with an advantageous embodiment.

Turning now to FIG. 12, an illustration of a process for manufacturing a composite component is depicted in accordance with an advantageous embodiment. The process illustrated in FIG. 12 may be used to create a composite component, such as composite component 300 in FIG. 3.

The process begins by positioning a pre-cured composite strip over a surface of a composite component where a caul plate seam may be expected (operation 1200). Next, the pre-cured composite strip is bonded to the surface of the composite component (operation 1202). The bonding may be achieved through the use of an adhesive layer, in these examples. The caul plate seam may be an area or section where a gap may be expected between adjacent two caul plates placed onto the composite component. Next, the process places the caul plates onto the composite component (operation 1204). Then, process cures the composite component (operation 1206) with the process terminating thereafter.

The different steps illustrated in FIG. 12 only depict some of the steps involved in manufacturing a composite component with a desired amount of surface finish or appearance. Of course, other steps may be involved in preparing the composite component both in forming the composite component and preparing the composite component for curing.

Thus, the different advantageous embodiments provide a method and apparatus for applying a pre-cured composite strip to a composite component. A pre-cured composite strip having a thermoset resin may be placed on a surface of a portion of the composite component where a caul plate seam is expected. Caul plates may be placed on the composite component after placing the composite strip to form the caul plate seam. The composite component may be cured after placing the caul plates on the composite component.

In this manner, different advantageous embodiments may reduce inconsistencies on a finished composite component. The different examples depict features that may be found in some of all of the advantageous embodiments. Different combinations of these features may be used to reduce inconsistencies in the appearance of the surface of composite components.

The description of the different advantageous embodiments has been presented for purposes of illustration and description, and is not intended to be exhaustive or limited to embodiments in the form disclosed. Many modifications and variations will be apparent to those of ordinary skill in the art. For example, the depicted embodiments may apply the method and apparatus to the production of a composite fuselage. The different advantageous embodiments may be applied to reducing blemishes on other components or parts. For example, some advantageous embodiments may be applied to other components, such as, without limitation, a wing or a tail of an aircraft. Further, different advantageous embodiments may provide different advantages as compared to other advantageous embodiments. The embodiment or embodiments selected are chosen and described in order to best explain the principles of the disclosure, the practical application, and to enable others of ordinary skill in the art to understand the various embodiments with various modifications as are suited to the particular use contemplated.

What is claimed is:

1. A method of manufacturing a pre-cured composite strip for use with a composite part, the method comprising:

laying up a composite strip comprising a set of fibers and a thermoset resin on a base plate, the composite strip characterized by a longitudinal axis, the set of fibers oriented substantially perpendicular to the longitudinal axis;

curing the composite strip on the base plate to form the pre-cured composite strip, the thermoset resin configured not to melt or soften after curing;

applying the pre-cured composite strip to a surface comprising a fiber reinforced composite material of the composite part, wherein the pre-cured composite strip has a width and a length and wherein the pre-cured composite strip has a thickness that tapers towards opposing edges of the width of the pre-cured composite strip; and placing a first caul plate and a second caul plate over the composite material and the composite strip, the first caul plate and the second caul plate defining a seam that overlies the composite strip.

2. The method of claim 1, further comprising a forming step including:

placing a layer of composite tape over a first layer of composite fabric, the composite tape comprising a plurality of fibers oriented substantially perpendicular to the longitudinal axis; and placing a second layer of composite fabric over the layer of composite tape to form composite layers.

3. The method of claim 2, wherein the forming step further comprises:

placing a first layer of peel ply over the composite layers; and placing a second layer of peel ply under the composite layers.

4. The method of claim 2, wherein the first layer of the composite fabric has a first width, the layer of the composite tape has a second width that is less than the first width, and the second layer of the composite fabric has a third width that is less than the second width.

5. The method of claim 2, wherein the composite tape, the first layer of the composite fabric, and the second layer of the composite fabric include thermoset resins.

6. The method of claim 3 further comprising:

replacing the first layer of peel ply with an adhesive layer after curing the pre-cured composite strip; and replacing the second layer of peel ply with a surface layer after curing the pre-cured composite strip.

7. The method of claim 2, wherein the thermoset resin does not melt or soften if subjected to a second curing process.

8. The method of claim 1, wherein the base plate is substantially flat.

9. The method of claim 1, wherein the base plate comprises a curvature that substantially matches an outer mold line for the composite strip.

10. A method of applying a pre-cured composite strip for use with a composite part, the method comprising:

placing a first peel ply layer on a base plate;

placing a first composite fabric layer on the first peel ply layer, the first composite fabric layer comprising a fiber material and a thermoset resin;

placing a tape layer on the first composite fabric layer, the tape layer comprising a plurality of unidirectional fibers and the thermoset resin, the tape layer characterized by a longitudinal axis, the plurality of unidirectional fibers oriented substantially perpendicular with respect to the longitudinal axis;

placing a second composite fabric layer on the tape layer, the second composite fabric layer comprising a fiber material and the thermoset resin; and curing the first composite fabric layer, the tape layer, and the second composite fabric layer to form the pre-cured composite strip, the thermoset resin in the first composite fabric layer, the tape layer, and the second composite fabric layer configured not to melt or soften after curing;

placing the pre-cured composite strip on a surface comprising a fiber reinforced composite material of the composite part;

bonding the pre-cured composite strip onto the surface of the composite part with an adhesive;

placing a first caul plate and a second caul plate over the surface of the composite part such that a seam between the first caul plate and the second caul plate overlies the pre-cured composite strip; and curing the composite part.

11. The method of claim 10 further comprising removing the first peel ply layer so as to expose a surface of the first composite fabric layer.

12. The method of claim 11 further comprising placing an adhesive on the surface of the first composite fabric layer; and bonding the surface of the first composite fabric layer with the adhesive to the composite component.

13. The method of claim 10 further comprising placing a second peel ply layer on the second composite fabric layer.

14. The method of claim 10 further comprising placing an additional tape layer on the tape layer.

15. The method of claim 10, wherein the first composite fabric layer has a first width; the tape layer has a second width that is smaller than the first width; and the second composite fabric layer has a third width that is smaller than the second width.

16. The method of claim 10, wherein at least one of the first composite fabric layer and the second composite fabric layer is a prepreg layer.

17. A method of manufacturing a pre-cured composite strip for a composite part, the pre-cured composite strip oriented with respect to a longitudinal axis of a composite part, the method comprising:

placing a first peel ply layer on a base plate;

placing a first composite fabric layer on the first peel ply layer, the first composite fabric layer comprising a fiber material and a thermoset resin;

placing a tape layer on the first composite fabric layer, the tape layer comprising a plurality of unidirectional fibers and the thermoset resin;

placing a second composite fabric layer on the tape layer, the second composite fabric layer comprising a fiber material and the thermoset resin;

curing the first composite fabric layer, the tape layer, and the second composite fabric layer to form the pre-cured composite strip, the thermoset resin in the first composite fabric layer, the tape layer, and the second composite fabric layer configured not to melt or soften after curing;

removing the first peel ply layer so as to expose a surface of the first composite fabric layer;

placing an adhesive on the surface of the first composite fabric layer;

bonding the surface of the first composite fabric layer with the adhesive to a surface comprising a fiber reinforced composite material of the composite part, the composite part characterized by a longitudinal axis, the composite strip positioned such that the plurality of unidirectional fibers in the tape layer are oriented substantially perpendicular with respect to the longitudinal axis of the composite part, the composite part comprising a fiber reinforced with resin composite material; and placing a first caul plate and a second caul plate over the composite material and the composite strip, the first caul plate and the second caul plate defining a seam that overlies the composite strip.

18. The method of claim 17, wherein the first composite fabric layer has a first width; the tape layer has a second width that is smaller than the first width; and the second composite fabric layer has a third width that is smaller than the second width.

* * * * *